(12) United States Patent
Lindgren

(10) Patent No.: US 6,336,333 B1
(45) Date of Patent: Jan. 8, 2002

(54) REFRIGERANT AND METHOD OF USE IN REFRIGERATION SYSTEMS

(76) Inventor: Gary Lindgren, E. 6554 Seltice Way, Post Falls, ID (US) 83854

( * ) Notice: Subject to any disclaimer, the term of this patent is extended or adjusted under 35 U.S.C. 154(b) by 0 days.

(21) Appl. No.: 08/400,290

(22) Filed: Feb. 28, 1995

Related U.S. Application Data

(63) Continuation of application No. 07/937,303, filed on Aug. 31, 1992.

(51) Int. Cl.[7] ............................. C09K 5/00; F25B 1/00
(52) U.S. Cl. ............................................. 62/114; 252/67
(58) Field of Search ....................... 62/114, 115; 252/67

(56) References Cited

U.S. PATENT DOCUMENTS

| | | | | |
|---|---|---|---|---|
| 1,325,665 A | | 12/1919 | Crawford | 62/114 |
| 1,325,667 A | * | 12/1919 | Crawford | 62/114 X |
| 1,497,615 A | * | 6/1924 | Thompson | 62/114 X |
| 1,853,743 A | * | 4/1932 | Pollitzer | 62/114 X |
| 2,033,228 A | * | 3/1936 | Buffington | 62/114 X |
| 2,255,584 A | * | 9/1941 | Hubacker | 62/114 X |
| 3,336,763 A | * | 8/1967 | Lunde | 62/114 |
| 4,015,439 A | * | 4/1977 | Stern | 62/114 X |
| 4,183,225 A | * | 1/1980 | Politte et al. | 62/114 |
| 4,482,465 A | * | 11/1984 | Gray | 62/114 X |
| 4,495,776 A | * | 1/1985 | Nikolsky et al. | 62/114 |
| 5,056,323 A | * | 10/1991 | Rice et al. | 62/114 |
| 5,065,323 A | | 11/1991 | Rice et al. | 62/114 |
| 5,080,823 A | * | 1/1992 | Arnaud et al. | 62/114 X |
| 5,104,560 A | | 4/1992 | Huster et al. | 252/58 |
| 5,108,637 A | * | 4/1992 | Pearson | 62/114 X |
| 5,151,207 A | * | 9/1992 | Goble | 62/114 X |
| 5,360,566 A | | 11/1994 | Stevenson | 252/67 |

FOREIGN PATENT DOCUMENTS

| | | | |
|---|---|---|---|
| DE | 43-29477 A1 | 3/1995 | |
| GB | 148878 | 1/1922 | |
| GB | 2182766 * | 5/1987 | 62/9 |
| GB | 2 286 194 B | 8/1996 | |
| SU | 676604 * | 7/1979 | |
| SU | 1033522 A | 8/1983 | |
| SU | 1033523 * | 8/1983 | |

OTHER PUBLICATIONS

Kuijpers, L.J. "Possibilities for the replacement of CFC12 . . . ", Abstract in IIR, 1990.*
Manzer, L.E., "The CFC–Ozone Issue . . . ", Science, Jul. 6, 1990, vol. 249, pp. 31–35.*

(List continued on next page.)

Primary Examiner—William Doerrler
(74) Attorney, Agent, or Firm—R. Reams Goodloe, Jr.

(57) ABSTRACT

A refrigerant mixture. The mixture of propane and butane may be advantageously used as a substitute for R-12, thus eliminating the use of ozone depleting R-12 refrigerant. Ideally, the mixture is comprised of approximately 50% propane and 50% butane by liquid volume. Alternately, the mixture may contain up to about 75% of either propane or butane. A refrigeration process utilizing the mixture is also disclosed.

20 Claims, 1 Drawing Sheet

OTHER PUBLICATIONS

Kopko, W.L., "Beyond CFCs . . . ", Abstract in IIR, 1991.*
Missenden, J.F., "Propane, a refrigerant . . . ", Abstract in IIR, 1991.*
Althouse, et al., "Modern Refrig. and AC", Goodheart–Willcox, 1956, pp. 214–215.*
Booth, K.M., "Dictionary of Refrig. and AC", Elsevier, 1970, pp. 34, 144, and 216.*
Non–CFC Air Conditioning, Chemistry—Visualizing Matter, Published by Holt, Rinehart and Winstron, Inc., (c) 1996, p. 367.
Cover Letter for HC–12a, Petition Response USEPA Web Page, Sep., 1996.
Dortmunder Rundschau Articles, Oct. 11, 1990, 1 page.
Donnerstay Article, Oct. 18, 1990, 1 page.
Knudsen, H.J., Alternativer til Fuldt Halogenerede (CFC) Kolemilder, Danmarks tekniske Hojskole, Laboratoriet For Koleteknik, Feb., 1991.*
Kramer, D., Why Not Propane?, ASHRAE Journal, Jun., 1991, 1 page.*
Dortmunder Rundschau Article, Oct. 23, 1991, 1 page.*
Dohlinger, Manfred, Pro Propan—R—290 als R–22 Drop–in, Kalte u. Klimatechnik, Nov. 1991, 5 pages.*
Little, Arthur D. et al, Non–Inert Refrigerant Study For Automative Applications—Final Report, (Prepared for US Department of Energy), Nov., 1991.
Bodio, E. et al, Hydrocarbon–based Mixtures As Alternative Refrigerants For Compression Refrigerating Equipment, Refrigeration Machinery & Equipment, vol. 1, pp. 333–339.
Letter—Wolfgang Lohbeck, Greenpeace, Germany, Apr. 10, 1992, 7 pages.
Haukas, Hans, Future for Flammables, Abstract, NTH–SINTEF Refrigeration
Engineering, Trondheim, Norway, Jun., 1992, pp. 179–197.
Excerpt—Greenpeace Magazine, Edition IV of 1992.
Letter from Greenpeace to Dr. Helmut Kohl and Prof. Dr. Klaus Topfer, Jul. 15, 1992, 6 pages.
Press Release—Greenpeace, Jul. 16, 1992, 3 pages.
Article—Greenpeace fordert Treuhand heraus, 1 page.
Article—Kuhlen mit gutem Gewissen,, IN Hamburger Abendblatt, Jul. 23, 1992, p. 14?, 1 page.
Article—Oko—Kuhlung doch gerettet, in Nordsee–Seitung, Nov. 23, 1992, 1 page.
Article—70 000 Bestellungen vor Serienproduktion, in Ludenldicidet Hadirichten, Mar. 16, 1993, 1 page.
Article—Ein eiskalter, Blauer Engel, in Potsdamer Neuejte Nachjeichjteu, Mar. 13, 1993, 1 page.
Article—Der Kuhlschrank ohne Ozon–Killer, in Neues Deutschland, Jul. 17, 1992, 1 page.*
Chart "Zuruck", 1 page
Press Release—Greenfreeze: Der FCKW–freie Kuhlschrank, Themen&Kampagnen/Klima: FCKW & Ozonschicht, 3 pages.
Press Release—Themen & Kampagnen Greenpeace: die Fakten, 4 pages.
Der Streit um den umweltfreundlichen Kuhlschrank, Frankfurter Allgemeine Zeitung, Jul. 22, 1992, N. 168, Seite 12/Mittwoch, 1 page.
Rheinischer Merkur Article, Patenlosung Ohne Patent, Von Eckart Klaus Roloff, Aug. 14, 1992, 31, N. 33.
Toro, Taryn, German Industry Freezed Out Green Fridge, New Scientist, Aug. 22, 1992, vol. 135, No. 1835, p. 16.
Mikolajczyk, G., The Trouble With Freons, Prezeglad Techniczny, Aug. 31, 1992, pp. 23–24.
Messungen an Haushaltskuhlgeraten mit brennbaren Kaltemitteln, Heinz Jurgensen, Nov., 1992, DKV 19 Jahrestagung, 18–20, DKV Tagungsbericht Band 11/2.
Bodio, E., et al, The Ozone Hole is Not the Only Problem, From Prezeglad Techniczny, 1992, pp. 24–26.
Ecology Breakthrough: A CFC–less Fridge; Newsweek, Jan. 4, 1993, p. 44.
Bodio, E., et al, Working Parameters of Domestic Refrigerators Filled With Propane–Butane Mixture, International Journal of Refrigeration, 1993, vol. 16, No. 5, pp. 353–356.
Maclaine–Cross, I.L., Fireball, A Brief Report on Pilot Experiments to Measure the Insurance Risk of Hydrocarbon Refrigerants in Motor Cars, Jan. 16, 1994.
Risk Assessment of Flammable Refrigerants, A.D. Little, Part 3, Oct., 1995.
Maclaine–cross, I.L., Hydrocarbon Refrigerant Risk in Car Air–Conditioners, Oct. 23, 1995.
Surface Transportation, ASHRAE Handbook, American Society of Heat, Refrigeration and Air Conditioning Engineers, Atlanta, U.S.A., 1995, Chapter 8, 21 pages.
Cover Letter for HC–12a, Petition Response US EPA Web Page, Sep., 1996.
Johnson, Eric, et al., Global Warming Comparison of Hydrocarbons and HFC–134a in Automobile Air Conditioning, Oct. 16, 1996.
HC Refrigeration Technology in Cuba, Study Case, Dijkstra, Kessler, Schwank, and Tummers, Oct., 1996, pp. 119–123.
Maclaine–cross, Ian, Hydrocarbon Refrigerant Leaks Into Car Passenger Compartments, Nov. 7, 1996.
Code of Practice for Use of Hydrocarbon Refrigerants in Motor Vehicle Air Conditioning, Published by the Independent Australian Hydrocarbon Refrigeration Assoc., Nov. 1996.
Maclaine–cross, I.L., Insurance Risk for Hydrocarbon Refrigerants in Car Air–Conditioners, I.T.F.—I.I.R. Commissions, Melbourne, Australia, 1996.
Maclaine–cross, I.L., Comparative Performance of Hydrocarbon Refrigerants, I.T.F.—I.I.R. Commissions, Melbourne, Australia, 1996.
Chemistry—Visualizing Matter, published by Rinehart & Winston, 1996, p. 367.
Legal Status of HC—12a, Duracool 12a, and OZ–12, from US EPA Web page, Sep. 1998.
9.4 Refrigerants and Refrigeration Cycles, CRC Handbook of Mechanical Engineering, Frank Kreith, 1998, pp. 9–34 to 9–47.
9.8 Refrigeration Components and Evaporative Coolers, CRC Handbook of Mechanical Engineering, Frank Kreith, 1998, pp. 9–76 to 9–86.
Household Refrigerators and Freezers, ASHRAE Handbook, American Society of Heat, Refrigeration and Air Conditioning Engineers, Atlanta, U.S.A., 1998, Chapter 49, 18 pages.
Legal Status of HC–12a, Duracool–12a, and OZ–12, USEPA Web Page, Sep., 1998.
Independent Australian Hydrocarbon Refrigeration Association, "Code of Practice for Use of Hydrocarbon Refrigerants," Nov. 1996.
Maclaine–cross, "Hydrocarbon Refrigerant Leaks into Car Passenger Compartments," Nov. 7, 1996.
Johnson, Eric et al, "Global Warming Comparison of Hydrocarbons and HFC–134a in Automobile Air Conditioning," Oct. 16, 1996.

Dieckmann, J. et al., "Non–Inert Refrigerant Study for Automotive Applications—Final Report." U.S.D.O.E., by A.D. Little, Nov. 1991.

Macaine–cross, I.L., "Fireball—A Brief Report on Pilot Experiments to Measure the Insurance Risk of Hydrocarbon Refrigerants in Motor Cars." Jan. 16, 1994.

A.D. Little, "Risk Assessment of Flammable Refrigerants," Part 3: Car Airconditioning, Oct. 1995.

Missenden, J.F., "Propane, a refrigerant . . . ", Abstract in IIR, 1991.

Toro, Taryn, "New Scientist", vol. 135, No. 1835, p. 16, Aug. 22, 1992.

Newsweek, Jan. 4, 1993, "Ecology Breathrough: A CFC–less Fridge", p. 44.

Refrigerants and Properties of Superheated Vapors, Refrigeration Engineering, Published by John Wiley and Sons, 1945, pp. 57–59.

Modern Refrigeration and Air Conditioning, Althouse, et al, Goodheart–Wilcox, 1956, pp. 214–215.

Stoecker, W.F. et al., Refrigeration and Airconditioning, The Vapor Compression Cycle, McGraw Hill Book Company, 1958, pp. 38–47 + Fig. A3.

Booth, K.M., Dictionary of Refrigeration and Air Conditioning, Elsevier Publishing Co., 1970, pp. 34, 144, and 216.

Encyclopedia Britannica, 1980 Edition, pp. 563–567.

Stewart, et. al, ASHRAE, Thermodynamic Properties of Refrigerants, 1988.

Kuijpers, L.J.M., et al., Possibilities for the Replacement of CFC–12 in Domestic Equipment International Journal of Refrigeration, vol. 11, Jul. 1988, pp. 284–291.

Manzer, L.E., The CFC–Ozone Issue: Progress on the Development of Alternatives to CFCs vol. 249, Jul. 6, 1990, pp. 31–35.

Kopko, W.L., Beyond CFC's: Extending the Search for New Refrigerants, Abstract, International Journal of Refrigeration GB, 13, No. 2, 1990/03.

Missenden, J.F., Propane, A Refrigerant For Low–Capacity Systems, Abstract, Rev. Gen. Froid, FR, 80, No. 5, 1990/06, pp. 55–59.

* cited by examiner

REFRIGERANT AND METHOD OF USE IN REFRIGERATION SYSTEMS

This is a continuation of application Ser. No. 07/937,303 filed on Aug. 31, 1992.

TECHNICAL FIELD OF THE INVENTION

This invention relates to a novel refrigerant mixture for use in refrigeration systems. The refrigerant is not harmful to the ozone layer, and is particularly applicable in systems such as automobile air-conditioning and home refrigeration.

BACKGROUND OF THE INVENTION

A continuing demand exists for a simple, inexpensive refrigerant which can be used to reduce the level of ozone damaging compounds which can escape and harm the earth's atmosphere. In particular, there exists a need for a simple, low cost refrigerant which can be used as a substitute for refrigerant R-12, also commonly known as dichlorodifluoromethane. At normal atmospheric pressure, R-12 boils a −21.7° F., thus, any substitute must have properties sufficiently comparable that equipment can be used without costly modification.

In addition to the undesirable ozone depletion consequences which have been widely reported, those familiar with refrigeration systems will also recognize that R-12 and other fluorchlorocarbon refrigerants can contribute to the formation of acids under as a result of decomposition in a refrigerant system. Formation of such acids is not uncommon, and when it occurs, severe damage to metal surfaces in a refrigerant system can result. Moisture in an R-12 based refrigeration system can contribute to such acid formation, as can use of contaminated lubricating oils.

For the most part, the R-12 substitutes which have been proposed have been various substituted hydrocarbons, utilizing addition of bromine or other atoms, primarily in an attempt to produce a non-flammable refrigerant. Such substitutes have their own problems, such as undesirable toxicological effects on exposed individuals.

SUMMARY OF THE INVENTION

I have now invented, and disclose herein, a novel, refrigerant mixture which does not have the above-discussed drawbacks common to the fluorchlorocarbon refrigerants heretofore used of which I am aware. Unlike the refrigerants heretofore available, my product is simple, relatively inexpensive, easy to manufacture, and otherwise superior to those heretofore used or proposed. In addition, it provides a significant, demonstrated improvement with regard to protection against release of ozone depleting compounds.

Another important feature is the fact that my novel refrigerant is not conducive to formation of undesirable acid compounds while in use in a refrigeration system. This provides a unique safety feature when compared to many previously known refrigerants.

My novel refrigerant mixture is essentially a 50-50 mixture of propane and butane. However, up to as much as 75% of propane, or alternately, butane, may be utilized.

My novel refrigerant differs from those prior art products mentioned above in one respect in that no substitution of hydrogen molecules by halogen or other species is required. In its simplest form, my invention is the discovery that a mixture of propane and butane will provide suitable properties for direct substitution in R-12 systems.

Thus, the dual advantages of protection of the ozone layer, and low cost of the commonly available gases propane and butane gases, become important and self-evident in direct refrigerant substitution applications.

OBJECTS, ADVANTAGES, AND FEATURES OF THE INVENTION

From the foregoing, it will be apparent to the reader that one important and primary object of the present invention resides in the provision of a novel, improved refrigerant which does not contribute to the destruction of the ozone layer.

Other important but more specific objects of the invention reside in the provision of a refrigerant which may be directly substituted in R-12 based refrigeration systems, and which:

can be manufactured in a simple, straightforward manner;

results in comparatively low cost refrigerant mixtures;

in conjunction with the preceding object, have the advantage that they can be widely used without cost penalty in selected refrigeration systems; and, which provides a refrigerant gas mixture which is easy to use, install and remove.

Other important objects, features, and additional advantages of my invention will become apparent to the reader from the foregoing and the appended claims and as the ensuing detailed description and discussion proceeds in conjunction with the accompanying drawing.

DETAILED DESCRIPTION OF THE INVENTION

Widely utilized refrigerant systems which utilize R-12 include automotive and home refrigeration systems. Although the refrigerant mixture disclosed herein may be used with other types of refrigerant circuits, the invention will be disclosed with reference to several of the most commonly used types.

Figure 1:
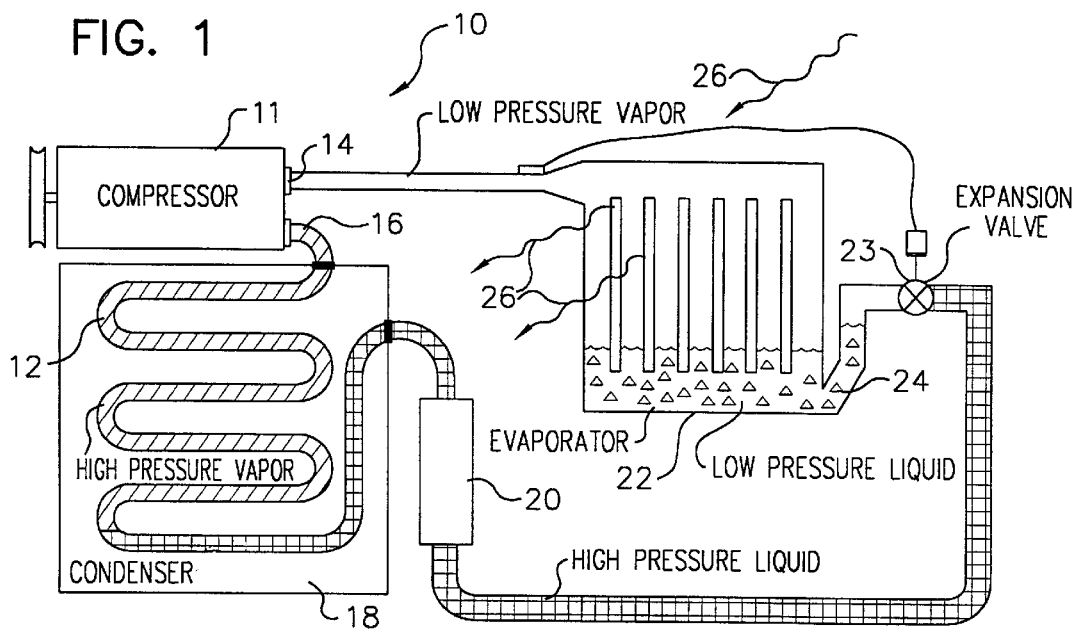
FIG. 1 is a process flow diagram for an automobile refrigeration system, in which the present invention may be employed.

Turning now to FIG. 1, there is shown an automotive type refrigeration system 10; this type of system is commonly utilized to cool the passenger compartment of cars and trucks. Critical components of the refrigeration system 10 include the compressor 11 which is used to raise the pressure (and the temperature) of a circulating refrigerant 12 from the cold, low pressure suction side 14 to the high temperature, high pressure discharge side 16. The refrigerant 12 pressure is raised so that it is capable of being condensed based at the internal temperature achievable in the condenser 18. Actual operating temperatures and pressures will vary widely and may be reviewed in a variety of texts on refrigeration. However, for a convenient point of reference, when the outside air entering an automotive condenser is 100° F., the high pressure circuit may operate at about 220 to 270 psig, while the low pressure circuit may operate at about 20–30 psig. Thus, the low pressure circuit pressure corresponds to a temperature of the cold refrigerant of roughly 20 to 30° F. Refrigerant 12 vapors which are condensed in condenser 18 are passed through a receiver 20, to accumulate the liquid refrigerant. The receiver may also include a desiccant (internal and not shown) for removal of water from the circulation refrigerant 12, so as to minimize the tendency of the refrigerant to form harmful, normally acid decomposition products.

In order to allow the high pressure refrigerant 12 to enter the low operating pressure evaporator 22, the refrigerant is metered through a thermal expansion valve 24. The liquid refrigerant 12 is allowed to escape into the lower pressure evaporator 22, and most of the refrigerant 12 will enter as a liquid to a pool 24 at the bottom of the evaporator 22. As heat is introduced to the evaporator 22 (as via an airstream 26 passing through the air passageways 28), liquid refrigerant 12 boils and becomes low pressure vapor, and travels to the low pressure side suction side 14 of the compressor 11, to repeat the process.

In most automotive type refrigeration systems, dichlorodifluoromethane (R-12) is used as the refrigerant. Unfortunately, this compound has been found to contribute to depletion of the upper atmospheric ozone layer. As a result, its use is being discontinued, as urged or as required by specific limitations in legislation in the United States and elsewhere.

I have found that a mixture comprised essentially of propane and butane can be directly substituted for R-12 in air-conditioning and refrigeration systems. Although the preferred composition is about 50% propane by liquid volume, with the remainder butane, the composition may be somewhat varied without encountering great difficulty. In fact, a mixture consisting essentially of up to about 75% propane, with the remainder butane, may be used. Preferably, as noted above, at least 50% propane may be used. In most cases, not less than 25% propane is desirable.

The aforementioned mixture is advantageous in that it does not contain halogen substituted molecules to cause problems such as acid formation and the resultant metal attack problems internal to the refrigeration circuit, as may be encountered with dichlorodifluoromethane. Also, both propane and butane are commonly available, at lower cost than most currently available refrigerants. Particularly in automotive applications, as set forth above, the flammable properties of propane and butane should not cause particular concern, in the quantities required for small refrigeration circuits, in view of the quantities of flammable fuel already successfully and safely transported on a regular basis.

Figure 2:
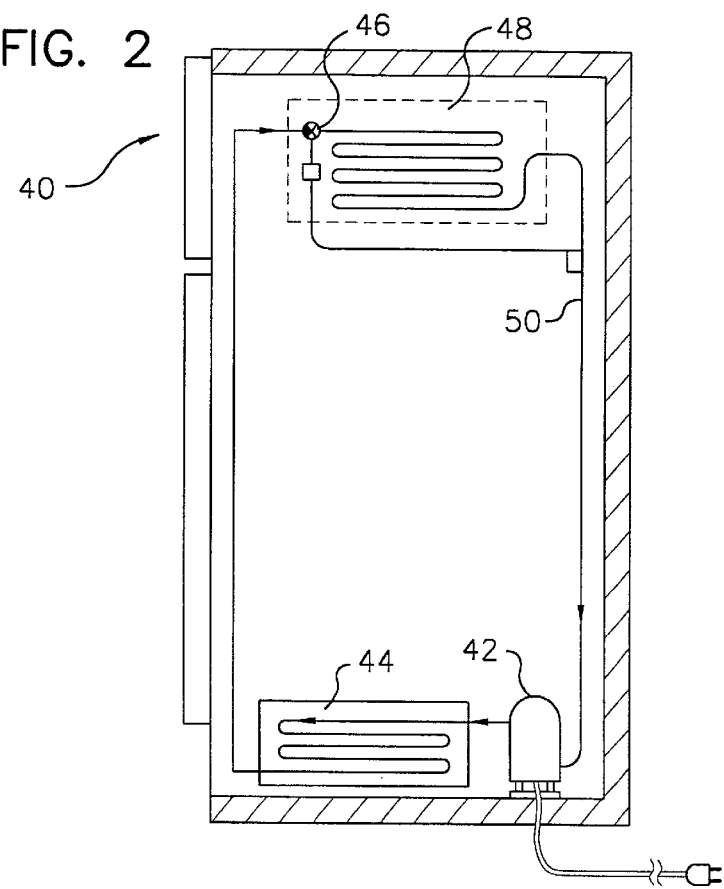
FIG. 2 is a process flow diagram for a refrigerator refrigerant circuit, showing the components of a typical residential refrigerator system.

My refrigerant mixture is also amenable for use in a home refrigerator system, such as is depicted in FIG. 2. A refrigerator 40 is shown having therein a compressor 42, a condenser 44, an expansion valve 46, an evaporator 48, and a low pressure vapor line 50 which returns to the compressor 42. Operation of the system is similar to that set forth above for the automotive refrigeration system, and need not be repeated in detail as it will be quickly recognized by those skilled in the art and to whom this invention is addressed. For reference, it is common for R-12 based refrigerator systems to operate at about 120 psig on the high pressure side, and at about 0 psig on the low pressure side. As a 50-50 mixture of propane and butane will condense at about 75 psig, this mixture provides a change of state of the refrigerant within an ideal range.

I have now discovered that the refrigerant gas commonly used in home refrigerator systems, dichlorodifluoromethane (R-12) may be advantageously replaced by a propane-butane mixture, preferably containing about 50% butane and the rest essentially propane. Also, I have discovered that the refrigerant mixture of about 50% propane and about 50% butane is more energy efficient than utilization of an R-12 refrigerant in home refrigerators. The exact savings, however, will vary according to the mixture utilized and the size of the system, particularly the compressor.

Thus, it can be seen that I have developed and have set forth herein an exemplary refrigerant mixture, and a method for use of same in common refrigeration machinery. The material is of low cost, is easily prepared, and does not tend to produce harmful acid breakdown products in refrigeration systems. Further, the mixture is quite compatible with refrigeration oils, and can be safely used in refrigeration systems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalences of the claims are therefore intended to be embraced therein.

I claim:

1. In an existing refrigeration system mechanically designed for use with refrigerant R-12, said system utilizing a refrigeration circuit comprising a compressor, a condenser, an expansion valve means, an evaporator, and a refrigerant for transport of thermal energy between the evaporator and the condenser, wherein said refrigerant is evaporated in said evaporator to produce a gas which is compressed by said compressor and thence sent to the condenser to be condensed to produce a liquid for metering into said evaporator by said expansion valve means, the improvement comprising a method of substitution of said R-12 refrigerant with a hydrocarbon based refrigerant mixture, said method accomplished by substantially purging said R-12 refrigerant from said refrigeration circuit, and then inserting said hydrocarbon refrigerant mixture into said refrigeration circuit, wherein said substitute hydrocarbon refrigerant mixture comprises a mixture of propane and butane, and wherein the amounts of said propane and said butane in said mixture are sufficient to provide physical properties of said mixture which approximate the physical properties of R-12 with respect to evaporation and condensation temperatures when under pressure, so that said hydrocarbon refrigerant mixture is utilized in said existing refrigeration circuit.

2. The process of claim 1, wherein said mixture of propane and butane comprises at least about twenty five percent (25%) propane by liquid volume.

3. The process of claim 1, wherein said mixture of propane and butane comprises at least about fifty percent (50%) propane by liquid volume.

4. The process of claim 1, wherein said mixture of propane and butane comprises approximately sixty percent (60%) propane by liquid volume.

5. The process of claim 1, wherein said mixture of propane and butane comprises about seventy five percent (75%) propane by liquid volume.

6. The process of claim 1, wherein said refrigeration system is employed in a motor vehicle.

7. The process of claim 6, wherein said motor vehicle comprises an automobile.

8. The process of claim 1, wherein said refrigeration system is employed in a residential refrigerator.

9. The process of claim 1, wherein said refrigerant mixture comprises about fifty (50) to sixty (60) percent propane by liquid volume, and about fifty (50) to forty (40) percent butane by liquid volume, with the liquid volume percentages of said components being the volume percentages of the overall refrigerant mixture.

10. The process of claim 1, wherein said mixture of propane and butane comprises approximately sixty percent (60%) propane and forty percent (40%) butane by liquid volume.

11. The process of claim 1, wherein said mixture of propane and butane consists essentially of sixty percent (60%) propane and forty percent (40%) butane by liquid volume.

12. The process of claim 1, wherein said existing refrigeration system further comprises a refrigerant oil composition, and wherein said refrigerant oil composition of said existing refrigeration system and said hydrocarbon based refrigerant mixture are compatible.

13. The process of claim 1, wherein after the step of substantially purging said R-12 refrigerant from said refrigeration circuit, said process further comprises the step of leaving said refrigerant oil composition in said refrigeration system.

14. In a refrigeration system mechanically designed for refrigerant flow rates compatible with use of refrigerant R-12, said system utilizing a refrigeration circuit comprising a compressor, a condenser, an expansion valve means, an evaporator, and a refrigerant for transport of thermal energy between the evaporator and the condenser, wherein said refrigerant is evaporated in said evaporator to produce a gas which is compressed by said compressor and thence sent to the condenser to be condensed to produce a liquid for metering into said evaporator by said expansion valve means, the improvement comprising a method of utilizing a hydrocarbon based refrigerant mixture, said method accomplished by purging said refrigerant circuit, then inserting said hydrocarbon refrigerant mixture into said refrigeration circuit, wherein said hydrocarbon refrigerant mixture comprises a mixture of propane and butane, and wherein the amounts of said propane and said butane in said mixture comprises at least about twenty five percent (25%) propane by liquid volume.

15. The process of claim 14, wherein said mixture of propane and butane comprises at least about fifty percent (50%) propane by liquid volume.

16. The process of claim 14, wherein said mixture of propane and butane comprises approximately sixty percent (60%) propane by liquid volume.

17. The process of claim 14, wherein said mixture of propane and butane comprises about seventy five percent (75%) propane by liquid volume.

18. The process of claim 14, wherein said refrigeration system is employed in a motor vehicle.

19. The process of claim 14, wherein said motor vehicle comprises an automobile.

20. The process of claim 14, wherein said refrigeration system is employed in a residential refrigerator.

* * * * *

(12) EX PARTE REEXAMINATION CERTIFICATE (7735th)
United States Patent
Lindgren

(10) Number: US 6,336,333 C1
(45) Certificate Issued: Sep. 14, 2010

(54) REFRIGERANT AND METHOD OF USE IN REFRIGERATION SYSTEMS

(75) Inventor: Gary Lindgren, Post Falls, ID (US)

(73) Assignee: OZ Technology, Inc., Rathdrum, ID (US)

Reexamination Request:
No. 90/007,098, Jun. 23, 2004

Reexamination Certificate for:
Patent No.: 6,336,333
Issued: Jan. 8, 2002
Appl. No.: 08/400,290
Filed: Feb. 28, 1995

Related U.S. Application Data

(63) Continuation of application No. 07/937,303, filed on Aug. 31, 1992, now abandoned.

(51) Int. Cl.
*C09K 5/00* (2006.01)
*F25B 1/00* (2006.01)

(52) U.S. Cl. .......................................... 62/114; 252/67
(58) Field of Classification Search .................. None
See application file for complete search history.

(56) References Cited

U.S. PATENT DOCUMENTS

| | | | |
|---|---|---|---|
| 2,676,468 A | * | 4/1954 | Schlumbohm .................... 62/7 |
| 4,365,941 A | | 12/1982 | Tojo et al. |
| 4,457,671 A | | 7/1984 | Watanabe |
| 4,526,596 A | | 7/1985 | Baggio et al. |
| 4,639,198 A | | 1/1987 | Gannaway |
| 4,948,525 A | | 8/1990 | Sasaki et al. |
| 5,037,572 A | | 8/1991 | Merchant |

OTHER PUBLICATIONS

Welty, Richard, "The Automotive Article Archive Server" Newsgroups: rec.autos.tech, Nov. 30, 1990, now archived at http://groups.google.com/groups?q=Archive+rec.autos.tech&hl=en&lr=&group=rec.auto...

Welty, Richard, "autos. *archive server information" Newsgroups: rec.autos.tech, Jan. 7, 1992, now archived at http://groups.google.com/groups?q=Archive+rec.autos.tech&start+10&hl=en&lr=&group...

Welty, Richard, "Automotive Article Archive Server" Newsgroups: rec.autos.tech, Sep. 2, 1992, now archived at http://groups.google.com/groups?q=Archive+rec.autos.tech&hl=en&lr=&group=rec.auto...

Welty, Richard, "rec.autos archive restoration" Newsgroups: rec.autos.tech, Jun. 30, 1994, now archived at http://groups.google.com/groups?q=Archive+rec.autos.tech&hl=en&lr=&group=rec.auto...

B. George, "Archiving rec.autos.tec" Newsgroups: rec.autos.tech, Dec. 10, 1995, now archived at http://groups.google.com/groups?q=rec.autos.tec&hl=en&lr=&selm=4af90a%24fal%40s...

"Google Groups—Basics of Usenet". Oct. 25, 2004 http://groups.google.com/googlegroups/basics.html.

"Google Groups—20 Year Usenet Timeline" Oct. 25, 2004, htt;://www.google.com/googlegroups/archive_announce_20.html.

"Google Press Release—Google Acquires Usenet discussion Service and Significant Assets from Deja.com." Oct. 25, 2004, http://www.google.com/press/pressrel/pressrelease48.html.

"Google Provides Access to Full Usenet Archives", The Write News, May 4, 2001, http://www.writenews.com/2001/050401_dejanews_archives.htm.

(Continued)

*Primary Examiner*—Beverly M. Flanagan

(57) ABSTRACT

A refrigerant mixture. The mixture of propane and butane may be advantageously used as a substitute for R-12, thus eliminating the use of ozone depleting R-12 refrigerant. Ideally, the mixture is comprised of approximately 50% propane and 50% butane by liquid volume. Alternately, the mixture may contain up to about 75% of either propane or butane. A refrigeration process utilizing the mixture is also disclosed.

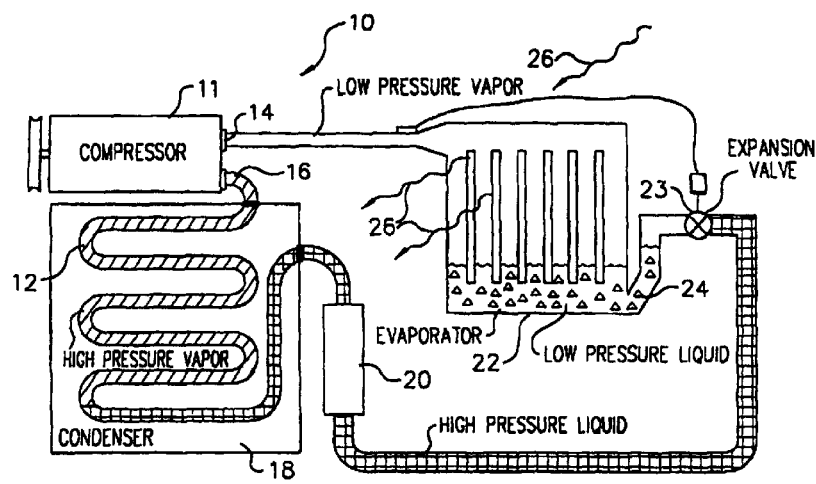

OTHER PUBLICATIONS

"Google Groups—Usenet Glossary", Oct. 25, 2004, http://groups.google.com/googlegroups/glossary.html.

"Google Groups Help—About Google Groups, Frequently Asked Questions", Oct. 25, 2004, http://groups.google.com/googlegroups/help.html.

Bodio et al., Testing Home Refrigerators Filled with Blend of Propane—Butane, Refrigeration–A Pub. of the Gen. Tech. Org., Jun. 1991, pp. 3–6, Poland (Fridocs No. 1992–2241).

Goble, Repost of Crazy Idea of Propane/Isobutane to Replace Freon R–12, Newsgroups: rec.auto.tech, Jul. 1, 1991.

Bougard, Overview of Substitutes for CFCs in Compression Systems, Mar. 19–20, 1990, pp. 65–88, Colloq. int. Brux., IIR (Fridocs No. 1991–0087).

Fisher, et al., Thermodynamic Calcs. for Mixtures of Environmentally Safe Refrigerants Using the Lee Kesler–Plocker Eq. of State, Jul. 17–20, 1990, (Fridocs No. 1991–1014).

Schulz, The Characteristics of Fluid Mixtures and their Utilization in Vapor Compression Refrig. Systems, 1985, Ashrae Trans., vol. 91, pp. 918–928 (Fridocs No. 1987–0100).

Behnia et al., Use of Mixed Refrigerants in Existing Systems, Jun. 1988, Airah J., pp. 34, 36–38, 40, Australia (Fridocs No. 1989–0851).

Wong, Alternative Compounds to Reduce Reliance on CFCs, Jun. 1989, South Bank Polytechnic Institute of Envir. Eng., Research Memo. No. 116, England (Fridocs No. 1990–0979).

IIR Information Resources Department, List of References Requested, undated.

Goble, Declaration and Affidavit of George H. Goble, Jun. 7, 2004.

De Silva, Grassroots: Greenfreeze Is Cool, Feb. 1996, Atmosphere, pp. 1–4.

Maclaine–Cross et al., Performance and Safety of LPG Refrigerants, Feb. 1995, Austrailian Liquefied Petroleum Gas Assoc. Proceedings, pp. 1–18.

Citizen Movement for Kryo Recycling and Cycle Economy, Unknown Date, Kryo, pp. 1–2.

Akzente, Special Edition—Hydrocarbon Technology, Undated, Germany (40 pages).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *